United States Patent Office 3,398,281
Patented Aug. 20, 1968

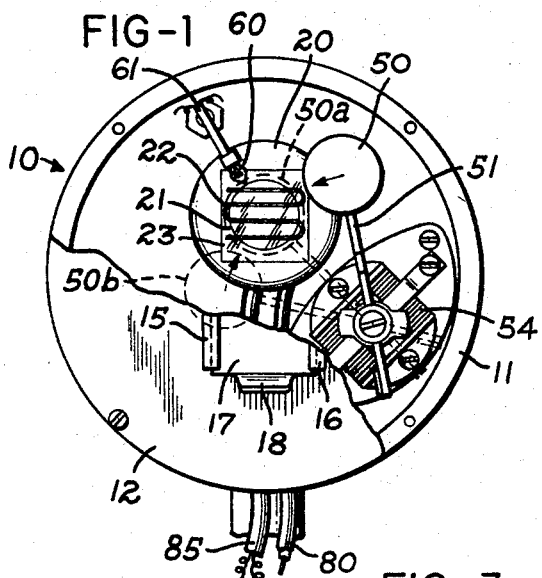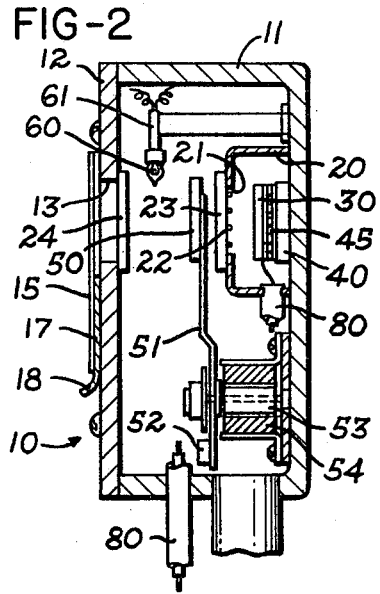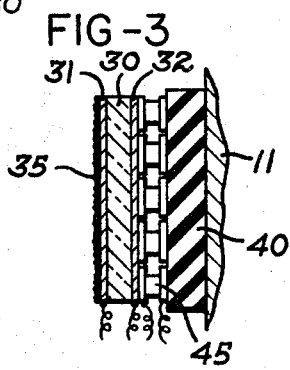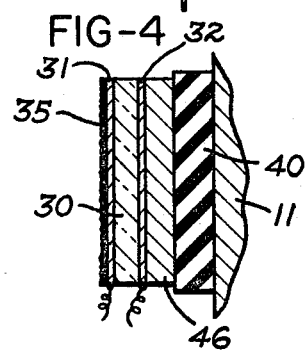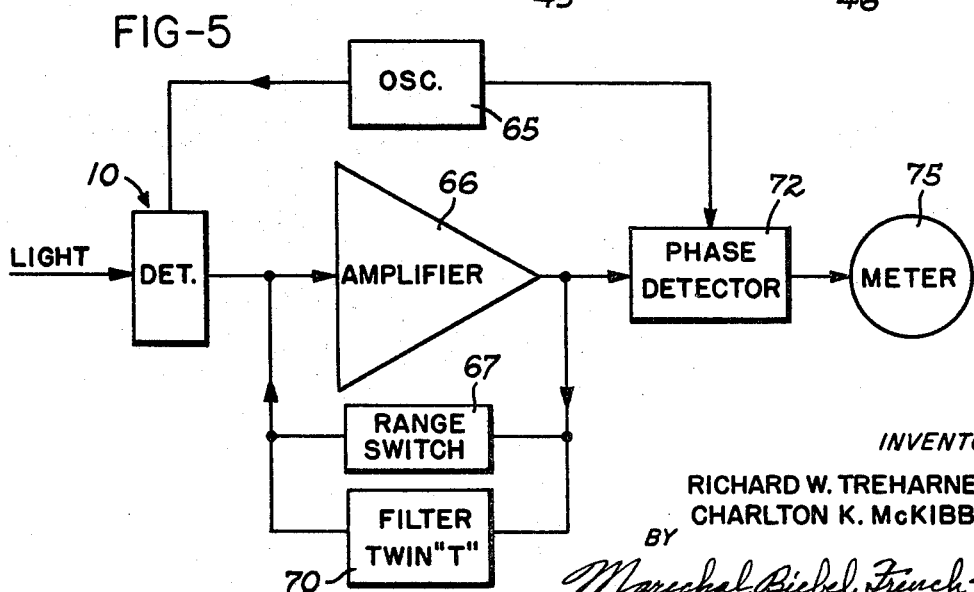
INVENTORS
RICHARD W. TREHARNE &
CHARLTON K. McKIBBEN
BY
Marechal, Biebel, French & Bugg
ATTORNEYS

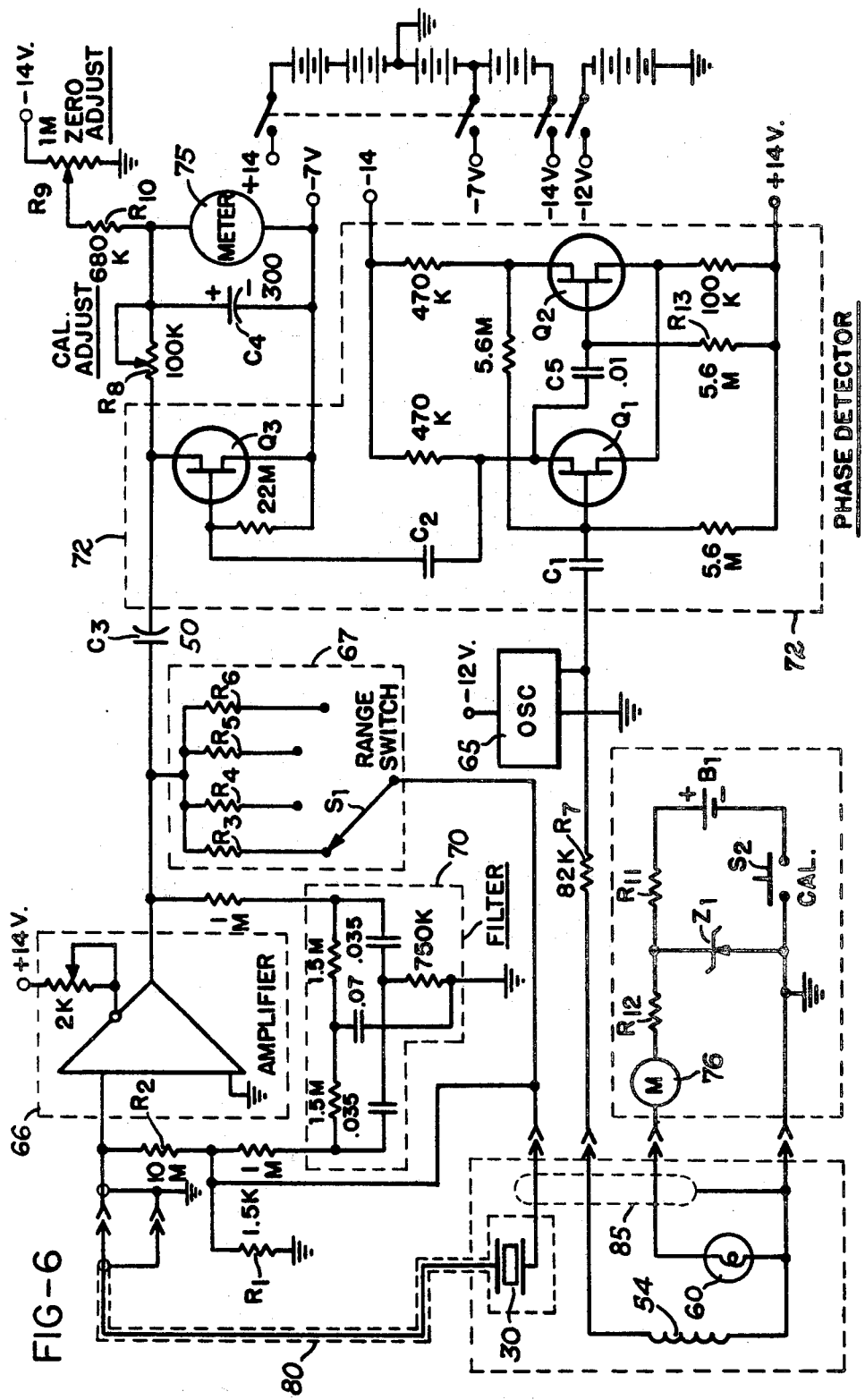

3,398,281
DIRECT READING, WAVELENGTH INDEPENDENT RADIOMETER EMPLOYING A PYROELECTRIC CRYSTAL DETECTOR
Richard W. Treharne, Zenia, and Charlton K. McKibben, Dayton, Ohio, assignors to Charles F. Kettering Foundation, Yellow Springs, Ohio, a corporation of Ohio
Filed Dec. 27, 1966, Ser. No. 604,976
10 Claims. (Cl. 250—83.3)

ABSTRACT OF THE DISCLOSURE

A lead zirconium titanate crystal possessing pyroelectric characteristics is employed in a direct reading, wavelength independent radiometer measuring directly the instantaneous radiant power of ultra-violet, visible and infrared light. The pyroelectric crystal is provided on two opposing surfaces with an electrically conductive material and a black body absorber is coated on the surface exposed to the incident radiation to convert that radiation into heat thereby polarizing the pyroelectric crystal and developing an electrical voltage related to the intensity of the radiation. A low inertia oscillating vane interrupts the incident radiation to provide a continuous voltage output from the crystal and filtering and gating circuits are included in the electronic readout circuit to minimize piezoelectric voltages which may be generated by mechanical forces transmitted to the crystal.

Brief summary of the invention

This invention relates to a radiometer for measuring irradiance or the total incident radiant power received for a unit area at a specific distance from the source of radiation.

Many radiation detectors for indicating the total incident radiant power have been developed and include photovoltaic cells, photodiodes, phototubes and photomultiplier tubes. These detectors offer sensitivity over a wide range of wavelengths but generally cannot provide relative measurements of radiant power at different wavelengths due to their non-uniform spectral response characteristics. In order to provide a wavelength independent measurement, it has been common practice to use some form of black body absorber to convert the incident radiant power into heat. Accordingly, some form of heat sensitive detector may then be employed to provide a wavelength independent measurement of the incident radiation. These heat detectors may include some form of thermopile or thermistor coated with a black body absorber material such as finely divided carbon black. For measurement of relatively small values of incident radiation power, these prior art detectors are not highly sensitive and do not have the required stability to provide a significant measurement of radiant power levels below 10 microwatts per square centimeter.

The wavelength independent radiometer of the present invention utilizes a crystal exhibiting pyroelectric characteristics, that is, the crystal is temperature dependent and when the temperature changes, electrical polarization of the crystal occurs to produce a voltage. This electric polarization will persist until the electric charge is neutralized either through internal or external current dissipation. The pyroelectric effect is somewhat similar to the piezoelectric effect of certain crystals in which polarization can be induced by pressure changes. It has been found that the crystals which exhibit the pyroelectric characteristics also exhibit piezoelectric characteristics, but the converse is not necessarily true. Therefore, certain types of anisotropic materials are employed as pyroelectric devices and such crystals have a structure which not only lacks a center of symmetry but which also have a single, unique polar axis.

In the present invention, a pyroelectric crystal formed preferably of lead zirconium titanate is placed in a housing to isolate it from mechanical forces and to reduce the piezoelectrical voltages which would be produced if these mechanical forces were transmitted to the crystal. A black body absorber is coated on the light receiving portion of the crystal and an oscillating vane is disposed between the crystal and the source of radiant energy to interrupt periodically the radiation received by the crystal and thus provides a continuously varying change in temperature at the crystal to permit a continuously varying voltage output therefrom. The range of voltage from the maximum to the minimum is therefore a measure of the intensity of the incident radiant light. In addition to the special mechanically mounting of the crystal, piezoelectric voltages are further eliminated by employing filter and gating circuits in the readout circuit of the radiometer which are synchronized with the frequency of oscillation of the moving vane.

The wavelength independent radiometer of the present invention is provided with a housing to isolate the pyroelectric crystal from ambient electrostatic fields since that crystal is a high impedance device and will pickup voltages induced by such fields. The housing also contains a calibrating radiant power source which may be used when excluding other forms of radiation from the crystal. The pyroelectric characteristics of the crystal may be enhanced by maintaining the crystal at a temperature immediately below its Curie point temperature. This is accomplished in the present invention by mounting the crystal on a thermoelectric element which is capable of maintaining a constant tempearture, either above or below the ambient.

Accordingly, it is an object of this invention to provide a direct reading, wavelength independent radiometer capable of measuring extremely small quantities of incident radiation power by using a pyroelectric crystal coated on its radiation receiving portion with a black body absorber; to provide a wavelength independent radiometer employing a crystal exhibiting pyroelectric characteristics positioned within an electrostatic shield and so mounted thereto that mechanical forces from said shield are not transmitted to the crystal; to provide a wavelength independent radiometer wherein the pyroelectric characteristics of a crystal are enhanced by maintaining by thermoelectric means the crystal at a temperature immediately below its Curie point temperature; to provide a direct reading, wavelength independent radiometer employing a crystal exhibiting pyroelectric characteristics having a black body absorber coated on its light receiving surface and mounted within a housing providing electrostatic and mechanical shielding wherein the radiation directed to said crystal is interrupted periodically by a low inertia light chopping mechanism causing the crystal to provide a continuously varying voltage output the magnitude of which is directly related to the intensity of the incident radiant power.

Other objects and advantages of the invention will be apparent from the following description, the accompanying drawings and the appended claims.

Brief description of the drawings

FIG. 1 is a front elevational view of the radiometer constructed according to this invention with the front cover shown partially broken away to expose to view the housing containing the pyroelectric detector, the calibrating light source, and the mechanism for interrupting periodically the light energy applied to the crystal;

FIG. 2 is a cross sectional view of the radiometer shown in FIG. 1;

FIG. 3 is a detail view illustrating the shock mounting the pyroelectric crystal and the relationship of the thermoelectric element to the crystal;

FIG. 4 is a detail view illustrating another embodiment employing a heat sink associated with the pyroelectric crystal to assist in dissipating heat;

FIG. 5 is a block diagram of the electrical circuit used to convert the light energy received by the pyroelectric crystal into a meter reading; and FIG. 6 is a detail schematic view of the circuit of FIG. 5.

Detailed description

The preferred embodiment of the wavelength independent radiometer 10 is shown in FIGS. 1 and 2 and includes a first housing means 11 having a cover 12 with an opening 13 therein positioned to admit radiation into the housing. Two guides 15 and 16 on the cover 12 support a slidable cover plate 17 movable from one position clear of the opening 13 to another position covering the opening to prevent external radiation from entering into the housing. The slide 17 is provided with an upwardly extending portion 18 which aids the operator in moving the slide between the two positions.

A second housing 20 is mounted within the first housing 11 and has an opening 21 positioned in alignment with the opening 13 to permit radiation to pass therethrough and onto the detector element. The housing 20, as well as the housing 11, are electrically conductive and provide an electrostatic shield for the detector. A further electrostatic shield includes a wire 22 electrically connected to the housing 20 and extending across the opening 21 several times. The wire 22 permits light freely to pass through the opening 21 but shields the interior of the second housing against external electrostatic fields.

A quartz window 23 may be provided in the opening 21 further to insulate the interior of the housing 20 against the ambient environment. The housing 11 may also be provided with a quartz window 24 across the opening 13 in the front cover. The window may be constructed from a fused quartz plate approximately 1.5 mm. thick such as fused quartz No. 101 manufactured by General Electric. This type of window provides a wavelength independent response (within three percent) over the range from 250 millimicrons to more than 3.3 microns. A different type of window may be used to restrict the response to any desired wavelength range.

A pyroelectric detector element or crystal 30 is shock mounted within the second housing 20 and provides a voltage proportional to the change in temperature of the crystal. The pyroelectric effect of the crystal 30 may be described as a temperature dependent, electric polarization exhibited by certain types of anisotropic materials. When a crystal of pyroelectric material is subjected to a temperature change, the crystal will be electrically polarized and this polarization will persist until the change is neutralized, either by current dissipation internally or through an external circuit. The pyroelectric effect is similar to the piezoelectric effect wherein electric polarization in the crystal is produced by pressure changes. It has been found that all crystals which exhibit the pyroelectric effect will also exhibit piezoelectric characteristics, although the converse is not necessarily true. In order to obtain pyroelectric characteristics, the crystal structure must lack a center of symmetry and have a single, unique polar axis.

While several types of pyroelectric crystals are available, it has been found that barium titanate or lead zirconium titanate are especially useful with the lead zirconium titanate crystal being preferred. In one embodiment of this invention, a crystal ⅜-inch diameter and 0.010 inch thick is formed from lead zirconium titanate manufactured under the trade designation PZT–5H available from Clevite Corporation of Cleveland, Ohio. The dimensions and type of crystal are selected to provide a compromise among high pyroelectric coefficient at room temperature, mechanical properties facilitating fabrication and time constant characteristics.

The crystal 30, shown in detail in FIG. 3, is coated on opposite surfaces with an electrically conducting coating 31 and 32 of silver epoxy. Electrical leads 33 and 34 are attached thereto for connection with the readout circuit.

The crystal is coated on the surface facing the openings 21 and 13 in the housings with a black body absorbing compound 35 such as carbon black suspension manufactured under the title "Parson's Optical Flat Black Lacquer" manufactured by Parson's Limited of England or Krylon Black Enamel No. 1602 manufactured by Krylon, Inc., of Norristown, N.J. A measurement of the reflectance of Krylon Black No. 1602 indicates that a wavelength independent response in the range from 250 millimicrons to more than 40 microns is possible It has been found that a black body coating of approximately 0.001 inch thickness is adequate to provide good thermal response characteristics, independent of wavelength.

The response characteristics of the radiometer as a function of the wavelength will be dependent upon both the effectiveness of the black body absorbing coating 35 on the crystal and the transmission characteristics of the windows 23 and 24 interposed in the path of the radiation. By careful selection of both of these elements, the wavelength dependence of the radiometer may be made substantially independent over a wide range of wavelengths.

The crystal 30 may be mounted either directly to a shock absorbing pad 40 directly in line with the openings 13 and 21 in the housings, or the crystal 30 may be mounted onto a thermoelectric element 45, which element in turn is mounted to the shock absorbing pad 40. The shock absorbing pad 40 may be rubber or other similar material to provide a shock mounting for the crystal 30 to minimize the transmission of mechanical forces to the crystal and thus minimize the piezoelectric voltages produced thereby.

The thermoelectric element 45 may be replaced with a heat sink 46, as shown in FIG. 4, constructed from a solid block of lead or other thermally conducting material to aid in dissipating the heat generated by the incident radiant energy.

It has been found that the pyroelectric characteristics of the crystal are enhanced by maintaining the crystal at a temperature immediately below its Curie point temperature. For this purpose, the thermoelectric element 45 is mounted adjacent the crystal 30 and is provided with a direct current voltage such that the crystal is maintained at a substantially constant temperature. The thermoelectric element 45 may be a semi-conductor material which generates heat as current is passed in one direction or which may cool the crystal 30 if current is passed in the opposite direction. Such a thermoelectric heater-cooler device is available from Westinghouse Electric Corporation.

Since the pyroelectric crystal detector produces a voltage in response to a change in temperature, means have been provided to interrupt periodically the radiation directed to the crystal and thereby cause a continuously varying temperature on the absorbing surface of the crystal. A low inertia vane 50 is mounted to move from a first position clear of the path of radiation through the openings 13 and 21 to the crystal 30 as shown in FIG. 1, to a second or intermediate position in the path of radiation, shown by the dotted line 50a. As shown in FIGS. 1 and 2, the vane has an area sufficient completely to shield the crystal from all incoming radiation when in the position shown by the dotted line 50a. In the preferred embodiment, the vane 50 is a relatively thin aluminum disc, ⅜-inch in diameter, mounted directly on a meter movement needle 51.

A center zero milliammeter may be used for moving the vane 50 at regular intervals, typically 3 cycles per second, from the position shown in the solid line in FIG. 1, through the second or intermediate position shown by the dotted lines 50a, to a third position clear of the radiation path as shown by the dotted lines 50b. The meter movement is modified by the addition of a counterweight 52 of a size sufficient to counterbalance the additional weight of the vane 50. In the embodiment shown, the armature 53 of the meter movement is a permanent magnet while the field consists of an electromagnet 54 which may be driven by a low power oscillator to cause the vane to oscillate between its extreme positions. Other types of means for moving the vane 50 periodically in front of the crystal 30 may be employed without departing from the scope of this invention. The particular arrangement thus described is a low inertial type movement and produces little vibration while in operation which could be transmitted to the crystal 50 and induce piezoelectric voltages.

Also contained within the first housing 11 is a calibrating light source 60 comprising a tungsten lamp supplied with a constant voltage from a regulated power source, normally at a voltage below the rated voltage of the lamp. The lamp 60 is mounted on an extension 61 from the housing 11 and is so positioned that the light from the lamp to the crystal may be interrupted completely by the vane when it is in the position shown in dotted lines 50a in FIG. 1. Other types of calibrating power sources, such as injection laser for example, may be substituted for the tungsten lamp.

Referring now to FIG. 5 which is a block diagram of the pyroelectric detector and the associated readout circuitry, the detector shown at 10 receives light from the measured radiant power source. The oscillator 65 supplies the oscillating current necessary for moving the vane into the path of radiation to cause a continuously varying voltage output and this output is applied to the operational amplifier 66, such as Model #132, manufactured by Zeltex. Associated with the amplifier 66 are a range switch 67 for controlling the amount of feedbacks to the operational amplifier and a twin T filter 70 tuned to the frequency of the oscillations of the vane 50.

The output of the amplifier 66 is fed to a phase detector 72. This detector also receives a signal from oscillator 65 and functions to gate the amplifier output through the phase detector and into the meter 75 in such a manner that the peak positive and peak negative voltage from the detector is applied to the meter. Thus, both the twin T filter 70 and the phase detector 72 operate together to limit the output of the detector to those signals which are due to the incident radiation and inherently reject all other signals to render the circuit essentially insensitive to the piezoelectric voltages generated by the crystal as a result of mechanical forces.

Reference is now made to FIG. 6 which is a detailed schematic of one form of readout circuit which has been used with the preferred form of radiometer shown in FIGS. 1 through 3. One of the electrically conducting surfaces on the crystal 30 is connected to a center conductor of a shielded cable 80 while the other end of the same conductor is connected to the input of the operational amplifier 66. One end of the shield of the cable 80 is connected to the housing 20 surrounding the crystal at the detector 10 and the other end to the chassis forming the electrical ground in the readout circuit. This shielding is provided to prevent electrical pickup of other signals at the high impedance input of the amplifier. Other components within the detector 10 are connected to the readout circuit through shielded cable 85.

The other electrode of crystal 30 is connected through cable 85 to electrical ground through resistor R1 of approximately 1.5K ohms. Resistor R1 and resistor R2 form a voltage dividing network and the total resistance of R1 and R2 appears as the input load of the crystal 30.

The output of the operational amplifier 66 is applied through a twin filter circuit 70 as negative feedback to the junction between resistors R1 and R2. This twin T filter circuit 70 is tuned so that it has an extremely high impedance to frequencies of three cycles per second, the frequency of oscillation of the vane 50 in the path of radiation to the crystal 30, and therefore only voltages having a frequency corresponding to the oscillation of the vane are amplified by the amplifier 66 while all other frequencies will be attenuated.

The magnitude of the gain from the amplifier 66 is the ratio of the feedback resistance to the resistance of resistor R1. Thus, the feedback resistance of the twin T filter 70 is extremely high for the selected frequency while the gain is low for all other frequencies. Parallel to the twin T filter 70 is a range switch 67, including resistors R3 through R6. Switch S1 selects one of these resistors and places it in parallel with the twin T filter 70 and thus reducing the gain of the amplifier by an amount proportional to the value of the additional resistance. With the pyroelectric crystal described above, sensitivity of better than 75 ergs/cm.$^2$-sec. has been obtained on the most sensitive range of the instrument.

The signal from the oscillator 65 is applied through a dropping resistor R7 to the field winding 54 of the meter movement in the housing 11 and thus causes the vane 50 to oscillate into the path of the radiation at a rate determined by the frequency of the oscillator. The signal from the oscillator 65 is also applied through a capacitor C1 to a monostable multivibrator including field effect transistors Q1 and Q2 within the phase detector 72. The output of the multivibrator is coupled through capacitor C2 to the gate electrode of field effect transistor Q3. Field effect transistors are used in the preferred embodiment of the readout circuit herein described over conventional transistors since the impedance of these field effect transistors is substantially higher when the transistor is cut off.

In operation, the monostable multivibrator is triggered by a positive going voltage from the oscillator 65 and remains on for a period of time determined by the values of C5 and R13. Thus, transistor Q3 is gated closed by the positive going voltage from the oscillator for a relatively small portion of the total cycle to shunt the output of the amplifier and thereby provide phase detection. Accordingly, electrical noise, including any piezoelectric voltage is inherently canceled. The output of the amplifier 66 is applied to the drain electrode of transistor Q3 through capacitor C3 and through a calibrating adjusting potentiometer or rheostat R8 to a first terminal on meter 75. An integrating capacitor C4 in parallel with the meter 75 allows the peak voltage output to be stored and then dissipated into the meter. The source electrode of Q3 is connected to the other terminal on meter 75.

The first terminal on the meter is supplied with a voltage through a zero adjusting potentiometer R9 and fixed resistor R10 which permits the meter to be zeroed when no radiant energy is falling upon the crystal 30. During the period when transistor Q3 is gated on, the output of the operational amplifier is effectively shorted around the meter 75 and while the transistor is gated off, the output is allowed to appear across the meter 75 and capacitor C4. Since the positive peak and negative peak outputs of the operational amplifier are applied to the meter, an effective voltage doubling of the output signal is therefore obtained.

Referring to the lower left of the FIG. 6, it may be seen that the calibrating lamp 60 is supplied with a regulated voltage upon the closure of switch S2. This switch connects the battery B1 through resistor R11 to the Zener diode Z1 which regulates the voltage then applied through resistor R12 to the lamp 60. A milliammeter 76 may be included in series with the lamp 60 to monitor the current therethrough since the intensity of the light in the lamp is a function of the current. When in the calibrating mode, the range switch S1 connects resistor R3 in the feedback circuit and the calibrating potentiometer R8 is adjusted to obtain the proper reading on the meter 75. Other forms of calibrating light energy sources may be employed, as for example, an injection laser.

While the form of apparatus herein described constitutes a preferred embodiment of the invention, it is to be understood that this invention is not limited to this precise form of apparatus and that changes may be made therein without departing from the scope of the invention which is defined in the appended claims.

What is claimed is:

1. A direct reading, wavelength independent radiometer comprising,
    a housing means effective to shield the radiometer from electrostatic fields, mechanical forces and instantaneously changes in ambient temperature, said housing having an opening in one portion thereof to admit incident radiation thereinto;
    a pyroelectric crystal capable of undergoing changes in electrical polarization as a result of changes in the temperature sensed thereby for producing a voltage indicating the intensity of incident radiation applied thereto;
    shock mounting means mounting said pyroelectric crystal within said housing means in alignment with the opening therein to render said crystal substantially insensitive to mechanical forces and to minimize piezoelectric voltages produced thereby;
    an electrically conducting coating on opposite surfaces of said pyroelectric crystal and a black body absorbing coating on the surface of said pyroelectric crystal facing the opening in said housing means, said black body coating converting the incoming radiation into heat independent of the wavelength;
    a means movable between a first position clear of the path between said crystal and said source of radiation and a second position in the path of said radiation, said movable means having an area sufficient to shield the crystal completely from said radiation when in said second position;
    means to move said movable means at regular intervals between said first position and said second position and into the path of said radiation to cause periodic changes in the temperature of said crystal thus causing the crystal to produce a voltage the magnitude of which is an indication of the intensity of the incident radiation;
    and a readout circuit connected to said electrically conductive coatings on said pyroelectric crystal and responsive to the variations in voltage produced thereby as a direct function of the intensity of the incident radiation.

2. The radiometer defined in claim 1 wherein said housing means includes:
    a first housing shielding the radiometer from electrostatic fields, mechanical forces and instantaneous changes in ambient temperature, said housing having an opening in one portion thereof to admit incident radiation thereinto; and
    a second housing mounted within said first housing and having an opening therein in alignment with the opening in said first housing, said second housing providing further shielding from electrostatic fields, mechanical forces and from instantaneous ambient temperature changes;
    and wherein said pyroelectric crystal is shock mounted within said second housing.

3. The radiometer defined in claim 1 further including shutter means mounted on said housing means and movable between a first position clear of said opening therein and a second position over said opening to block completely the radiation passing therethrough to the pyroelectric crystal; and
    a radiant power source within said housing means so positioned that the radiation therefrom is directed onto said pyroelectric crystal to provide a source of radiant energy of known intensity to permit calibration of the radiometer when said shutter means is in the second position.

4. The radiometer defined in claim 1 further including quartz windows positioned over the opening in said housing means further to isolate the pyroelectric crystal from instantaneous ambient changes.

5. The radiometer defined in claim 1 further including means thermally coupled to said pyroelectric crystal to maintain said crystal at a temperature immediately below its Curie point temperature to enhance the pyroelectric polarization thereof and further to isolate said crystal from instantaneous changes in the ambient temperature.

6. The radiometer defined in claim 1 further including heat sink means thermally coupled to said pyroelectric crystal to aid in dissipating the heat generated by the incident radiant energy.

7. The radiometer defined in claim 1 wherein said readout circuit includes a phase detector circuit synchronized with the periodic movements of said movable means interrupting the radiation to said crystal to allow only those signals having a frequency in the range of the frequency of oscillation of said movable means to pass therethrough to render the output of said circuit essentially independent of piezoelectric voltages generated by said crystal due to mechanical forces.

8. The radiometer defined in claim 1 wherein said readout circuit includes a filter circuit having a band pass frequency centered about the frequency of the periodic movements of said movable means interrupting the radiation to said crystal further to permit amplification of only those signals having a frequency in the range of frequencies of oscillations of said movable means to render the output of said circuit independent of piezoelectric voltages generated by said crystal due to mechanical forces.

9. A radiometer defined in claim 1 further including electrostatic shielding means disposed across the opening in said housing means to isolate the pyroelectric crystal contained therein from ambient electrostatic fields.

10. The radiometer defined in claim 1 wherein said pyroelectric crystal is formed from lead zirconium titanate.

References Cited

UNITED STATES PATENTS

| | | | |
|---|---|---|---|
| 3,204,102 | 8/1965 | Hand | 250—83.3 |
| 3,320,420 | 5/1967 | Paglee et al. | 250—83.3 |
| 3,356,846 | 12/1967 | Rupert et al. | 250—83 |

ARCHIE R. BORCHELT, *Primary Examiner.*